Dec. 13, 1966     P. A. HOUSE     3,291,333
SELF-SEALING CONSTRUCTION FOR SPACE VEHICLES
Filed Feb. 23, 1962
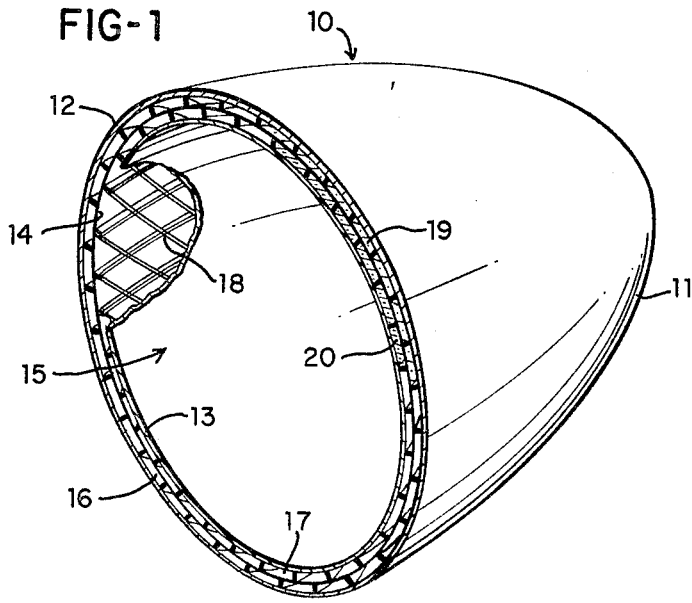
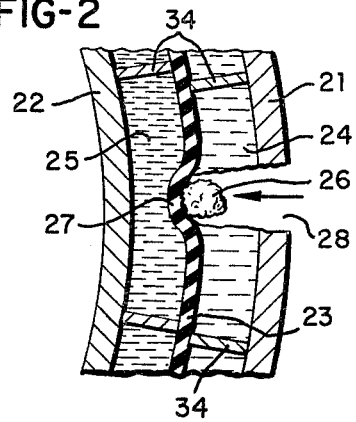
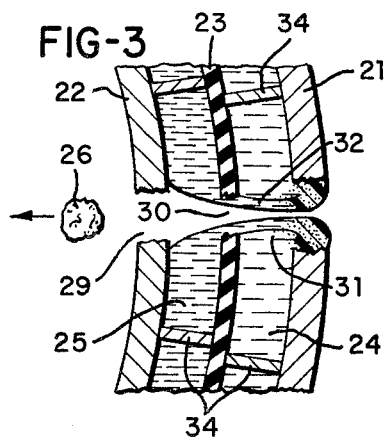
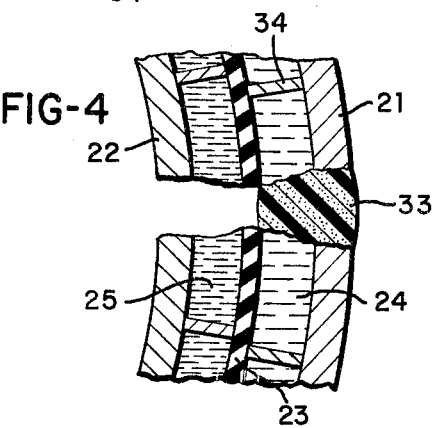
INVENTOR.
PHILIP A. HOUSE
BY *Wade Loouty*
ATTORNEY United States Patent Office 3,291,333
Patented Dec. 13, 1966

3,291,333
SELF-SEALING CONSTRUCTION FOR
SPACE VEHICLES
Philip A. House, Dayton, Ohio, assignor to the United
States of America as represented by the Secretary of
the Air Force
Filed Feb. 23, 1962, Ser. No. 175,375
5 Claims. (Cl. 220—15)

The invention described herein may be manufactured and used by or for the United States Government for governmental purposes without payment to me of any royalty thereon.

The present invention relates to a self-sealing construction for vehicles designed for travel in interstellar space or at least beyond the reaches of the earth's atmosphere and particularly to such vehicles which are capable of preserving therewithin a life-supporting atmosphere, notwithstanding the vacuum through which they will travel.

It is of course possible to establish a controlled atmosphere within a closed vehicle by the well known expedients of pressurization such as are now commonly employed in high-flying, passenger-carrying aircraft. Beyond the reaches of our earth's atmosphere however, space is known to be coursed by innumerable meteoroids traveling at planetary speeds on the order of fifty thousand feet per second. Because of the great numbers of such particles and of the ability of many of them to penetrate the vehicle, it follows that they and the wall openings carved by them represent a substantial threat to the maintenance of a pressurized atmosphere within the vehicle. While it might be possible to provide the vehicle with means for restoring the lost pressure and atmosphere, it is obvious that factors of size and weight place a considerable limit on the capacity of such a source; and, in view of the great number of openings that might result from contact with the innumerable meteoroids to be encountered, it is not difficult to envision many circumstances wherein it would be impossible to maintain the inner atmosphere unless some means are provided for closing the wall openings very soon after they are formed. Because the meteoroids are often very small and the openings made thereby will be of minute diameter, detection will in most cases be difficult if not impossible. Moreover, since a large number of meteoroids may be encountered at a particular time, it would be impractical to rely on passengers in the vehicle manually to close the openings once formed.

In view of the foregoing, some automatic means for closing the openings is obviously desired, and a self-sealing wall or liner is called for. While various self-sealing expedients are known and used for various terrestrial and geoatmospheric applications such as pneumatic vehicular tires, fuel cells for military aircraft and the like, they have in no case been designed for or intended to respond to the extremely high velocities encountered in celestial space travel; and, in almost all cases, the prior art constructions have not been required to operate against the pressure differential that is involved between an atmospheric pressure of approximately 14.7 pounds per square inch within the space vehicle and a perfect or near perfect vacuum surrounding the same. Because of these extreme conditions, peculiar to outer space, the various solid and semi-solid materials which have been employed as sealants in vehicular tires and fuel cells for example will not be effective. The solids on the one hand, particularly where they are in powdered or granular form, will be scattered from the opening by the high-velocity impact of the meteoroid particle, and the semi-solids on the other hand will not react with sufficient speed to preserve the inner atmosphere against the many openings that might reasonably be expected to be made within a relatively short time interval. Compounding the inapplicability of known sealing means and methods to space vehicles has been the fact that the prior art, lacking the problems of high-velocity impact or substantial pressure differentials, has relied almost exclusively upon sealing responses to physical changes or changes which are slower than might be available in a chemical reaction. In view of this relatively long reaction time, tests have shown that, under the conditions of outer space, many of the prior art sealants will simply escape from the vehicle through the opening that is to be sealed, thus flowing away before there is time for the swelling or solidifying to take place.

It is accordingly an object of the present invention to provide a self-sealing construction for space vehicles capable of maintaining a life-supporting atmosphere therein throughout long exposure to celestial conditions.

It is a further object of the present invention to provide a wall or a wall liner for such vehicles which will automatically seal such openings as are formed therein by the penetration of meteoroids.

Still another object of the present invention is to provide such a wall or liner with a sealing means which will not be incapacitated or rendered ineffectual by the penetration of high velocity meteoroids.

Yet another object of this invention is to provide such sealing means which will react in direct response to the formation of punctures at a rate which is faster than the rate at which the material will tend to flow from the vehicle under the influence of the relatively high pressure therewithin.

These and other objects and advantages which will be apparent from a reading of the following disclosure are achieved in the case of the present invention by the provision of a hollow-walled closure unit housing a two-component system wherein the components will be separately maintained until such time as the unit is penetrated, whereupon the components will intermix and react to form a seal of the opening formed by such penetration. One of such components is a fluid capable of polymerization by molecular cross-linking or molecular extension such as a liquid diisocyanate. The other component is a cross-linking agent, foaming agent or catalyst, likewise in liquid form, which, when exposed to the first component, will cause such first component to polymerize. Such components are maintained in a double walled enclosure and are held apart by a third wall or membrane interiorly thereof until at least this membrane is pierced by a meteoroid, at which time the two components will come in contact under pre-determined conditions of rate and proportion so as to effect a coagulation or polymerization into a tough, non-flowing substance capable of sealing the puncture against loss of pressure from within the vehicle. The proportions in which and the rate at which the reactive components come together to form such a seal is controlled in a preferred embodiment by a relatively elastic and tear resistant separating membrane so as to minimize the size of the opening that will be made therethrough and by the employment of a relatively high-viscosity fluid, usually the polymerization material, toward the outer or vacuum side of the vehicle and of a relatively low-viscosity material, usually the catalyst, inwardly or toward the pressurized side of the vehicle.

The invention thus generally described may be more clearly understood by reference to the following detailed description of certain preferred embodiments thereof in connection with which reference may be had to the appended drawings.

In the drawings:

FIGURE 1 is a fragmentary perspective view partially broken away and in partial cross section of a space vehicle having a self-sealing wall construction according to the present invention.

FIGURE 2 is an enlarged fragmentary cross-sectional view of a hollow-walled closure unit according to the present invention as it appears under the influence of a projectile in the process of passing therethrough, immediately prior to the penetration of the intermediate membrane.

FIGURE 3 is an enlarged cross-sectional view of the construction of FIGURE 2 immediately following the passage of the projectile therethrough.

FIGURE 4 is an enlarged cross-sectional view of the wall unit of FIGURES 2 and 3 illustrating the seal that is formed against the opening formed by the passage of the projectile.

A typical portion of a space ship 10 of the type considered by the present invention is illustrated in FIGURE 1 to comprise a skin or shell 11 which might be of a rigid, metallic material in a configuration conforming to any desired shape. In combination with or in addition to this outer skin 11, a self-sealing construction according to the present invention is shown to comprise the double, hollow-walled unit or liner comprising an outer wall 12, an inner wall 13 and an intermediate wall or membrane 14 which is positioned between the walls 12 and 13 to define separate hollow chambers, 16 nearer the exterior of the space ship and 17 nearer the interior thereof. The outer wall chamber 16 is filled with a relatively high-viscosity liquid component and the inner wall chamber 17 is filled with a relatively low-viscosity liquid component.

Within the walled chambers are positioned honeycomb structures 18 which will further divide each of the inner and outer chambers into a plurality of relatively small compartments, each isolated from the other by the interconnecting, criss-crossed strips forming the honeycomb structure so that any opening in a chamber wall will expose only a relatively small quantity of the fluid within the entire chamber and so that the dimensional stability of the closure unit and the spatial relationship of its components will be substantially maintained throughout the stresses and strains of its space flight.

Depending upon the particular demands which are expected to be made upon the space vehicle and upon the materials of which the same is composed to meet such demands, the outer wall 12 of the hollow-walled closure unit itself might actually be employed as the outer skin or shell of the ship, thus displacing the shell represented by the number 11 in FIGURE 1. On the other hand, the sealant wall assembly, in lieu of being employed as a liner substantially contiguous and coextensive with the outer shell 11 as shown in FIGURE 1, may be spaced from the outer shell by a substantially uniform distance throughout the entire space ship or may, in fact, be employed surrounding only the passenger-carrying cabin within the interior 15 of the vehicle. In any event, it is to be understood that the interior 15 of the compartments enclosed by the sealing wall construction will be pressurized to provide a controlled atmosphere capable of comfortably supporting human life and that the pressure will be on the order of 14.7 pounds per square inch so as to approximate the conditions of the earth's atmosphere at sea level. When the vehicle is passing through celestial space however, it will be further understood that a substantially complete vacuum will surround its exterior.

Referring now in greater detail to the construction and arrangement of the parts of the self-sealing hollow-walled closure unit, reference is made to FIGURES 2, 3 and 4 wherein a preferred embodiment is shown to comprise the outer wall 21, the inner wall 22 and the intermediately positioned wall or membrane 23 which divides walled-in space into the outer and inner wall compartments. Particularly where such a double, hollow-walled sealing structure is to be employed as a liner as illustrated in FIGURE 1, the outside wall 21 and inside wall 22 may be composed of rubber or a synthetic rubber such as the various well known polymers and copolymers of styrene, acrylonitrile, the polysulfides or the like on the order of from .030 to .075 inch in thickness with or without reinforcement such as laminated fabric, interspersed fibers, wire mesh or the like. While the primary function of the walls 21 and 22 is to contain the reactive components to be housed therein, and while any fluid-impervious, corrosion-resistant material or assembly may be employed, in certain applications these walls may be so modified as to have structural significance per se in connection with the vehicle or its passenger cabins.

The membrane 23, like the walls 21 and 22, must be impervious to the passage of the reactive components to be separated thereby. In addition to being flexible, this membrane 23 is preferably of a tear-resistant and relatively elastic material so that it will yield and stretch under the influence of the initial impact therewith of a high-velocity particle such as the meteoroid 26 as a result of which it will be in a stretched condition when the meteoroid pierces it. As a result of this piercing of the stretched material, a relatively smaller portion of the membrane material will be removed by the passage of the meteoroid; and, when the membrane returns elastically to its original position, the opening left therein will be relatively smaller than if the membrane were not stretched at the time of puncture. Depending upon the physical properties of the meteoroid itself, such opening might even be smaller than the particle. While any elastomeric sheet having the above properties might be suitable for use as the membrane 23, it has been found that rubber or the synthetic rubber elastomers having a high modulus on the order of 460 pounds per square inch at 100% elongation and a high tensile strength on the order of 3500 pounds per square inch are desirable; and the butadiene-acrylonitrile copolymers have been found particularly suitable for this purpose. The characteristics of this synthetic rubber, commonly known as Buna-N, are such that, while it is normally somewhat tear resistant in its untensed state, such tear resistance changes in inverse proportion to tensile strain. Accordingly, once the meteoroid has placed the membrane at the point of its impact under tension, the membrane will tear more readily at such point and thereby contribute to the desired objective that the passage of the meteoroid therethrough will result in a minimum removal of material.

Immediately after the meteoroid 26 has passed completely through the entire sealing wall assembly as illustrated in FIGURE 3, the relatively greater atmospheric pressure within the vehicle and adjacent the inner wall 22 will tend to escape through the wall opening toward the vacuum exteriorly of the wall 21 and will force or carry with it the reactive components 24 and 25 which are, by virtue of the piercing of the membrane now able to come into contact with each other. It is at this point that the relatively small diameter of the membrane opening 30, the reaction time of the fluid components 24 and 25, their relative viscosities and the spacing between the membrane 23 and particularly the wall 21 are of critical importance. The fluid component 24, occupying the space between the outer wall 21 and the membrane 23 should be relatively more viscous, having a viscosity on the order of 10,000 poises and in any event over 5,000 poises, while the material 25 occupying the space between the inner wall 22 and the membrane 23 is of a relatively low or watery viscosity and experiments with viscosities on the order of from 0 to 400 centipoises have produced satisfactory results. As illustrated in FIGURE 3, the result of this combination is such that, immediately upon the passage of the meteoroid and the exposure of the pressurized atmosphere within the space vehicle to the vacuum surrounding the same, the viscous fluid 24 commences to flow relatively slowly toward the vacuum through the opening 28. After an infinitesimally small time lag however, the lower viscosity fluid 25, the flow rate of which is somewhat retarded by the relatively smaller diameter of the membrane opening 30, passes through to the vacuum side of the sealant assembly where, as a result of the fact that it is now on the vacuum side of its previously restricting orifice, flows more rapidly through the material 24 and, in fact, overtakes the same. This is illustrated in FIGURE 3 by the shorter flow lines 31 representing the activity of the more viscous fluid and the longer flow line 32 representing the more rapid transit of the lower viscosity fluid. In view of this timing and the manner and location of the contact between the fluids 24 and 25, a solidifying reaction between the two components will take place and form a seal at the opening 28 through the outer wall 21 so as to close the opening of the outer wall to the ambient vacuum and to prevent any further loss of atmosphere or pressure from the interior of the vehicle. Practically simultaneously with this sealing the contact between the fluids results in the formation of the plug 33 at least throughout the thickness of the chamber housing the polymerizable fluid 24 to further close the membrane opening 30.

It is of course necessary that the plug 33 be of a material that is impervious to the passage of air or atmospheric gases therethrough and at the same time is sufficiently strong and durable as to withstand pressures of atmospheric magnitude. It has been discovered that, not only do the materials commonly known as the polyurethanes have the necessary physical properties for forming and maintaining such a sealing plug but also that the time and manner of formation of such polyurethane materials may be conveniently and appropriately achieved by utilizing the arrangement of parts of the sealing wall assembly heretofore described. To achieve such a sealing plug, the liquid component occupying the outer sealing wall chamber; i.e. the space between the outer wall 21 and the membrane 23, may be any one of the various diisocyanate groups in liquid form such as polypropylene oxide toluene diisocyanate adduct which may be admixed with fillers such as silicone, carbon black, diatomaceous earth, or the like to achieve a viscosity on the order of 10,000 poises so that, under the influence of a pressure differential of 14.7 pounds per square inch, it will be slowly flowable until polymerized by cross-linking. The polymerizing fluid occupying the inner chamber of the sealing wall; i.e. the space between the inner wall 22 and the membrane 23 may then be a fluid which is reactive with the diisocyanate material to form a polyurethane upon contact therewith. Such materials, commonly referred to as cross-linking agents, in the case of a diisocyanate reaction may include any of the polyamines such as triethylene tetramine, hexamethylene diamine aqueous solution or ethylene diamine, although the latter has been found in experimental tests to be volatile to the extent that it might escape through the inner wall 22 and permeate the atmosphere within the interior of the space vehicle to the detriment of the comfort of the passengers therein. The particular cross-linking agent which has been found quite successful when used in conjunction with the polypropylene oxide toluene diiocyanate adduct mentioned above is triethylene tetramine.

Since the membrane opening 30 acts as a restricting orifice and is thus involved in the timing of the union of the reactive fluids subsequent to penetration, the spacing of the membrane, particularly relative to the outer wall 21 is important to the formation of a proper seal and it should therefore be maintained within broad but nonetheless critical limits. If, for example, the membrane were allowed to come in contact with the outer wall 21 and piercing should take place at such point, it can be appreciated that the polymerizing fluid 25 would simply escape from the wall assembly without the necessary contact and intermixing with the polymerizable fluid 24. The present invention therefore contemplates the provision of spacing means for holding the membrane away the wall 21; and, in the illustrated embodiments, these means comprise a honeycomb construction such as illustrated at 18 in FIGURE 1 or in cross section at 34 in FIGURES 2, 3 and 4. One preferred form of such a structure is seen to comprise the interconnected or interconnecting strips 34 the width of which is such as to span the distance between the membrane 23 and the walls such as 21 and 22 so that the respective edges of the strips are in contact with the membrane 23 on the one hand and either of the walls 21 or 22 on the other hand. These strips, for the purposes of spacing the walls, should be of a relatively rigid material such as steel, a rigid plastic or the like and should of course be resistant to corrosive attack by the fluid in which they will be immersed. While the spacing between the membrane 23 and the inner wall 22 is not critical from the standpoint of the timing of the sealing reaction that is to take place outwardly of the membrane, it is still desirable to place a honeycomb structure on both sides of the membrane, not only to improve the support of the membrane generally but also to perform a compartmentalizing function as will be hereinafter described.

In the case of the diisocyanate and amine reactions above described, the relative thickness of the chambers housing the fluids 24 and 25 and hence the quantities of such fluids available for a sealing reaction is not extremely critical, provided that a sufficient supply of the polymerizing material is available to polymerize a sufficient portion of the polymerizable material to form the necessary plug 33. The necessary plug will depend upon the thickness of the wall, either of the space vehicle or of the sealing construction itself, which is to be closed thereby. It has been found however that, in a typical self-sealing liner unit according to the present invention having inner and outer walls of approximately .075 inch in thickness, a diisocyanate layer of about the same thickness will produce reliably satisfactory results. At the same time, satisfactory sealing of such a liner has been effected where the thickness of the diisocyanate material adjacent the outer wall is as low as .030 inch and the thickness of the amine layer is proportionately smaller. For reasons of space and weight saving however, it may be desirable to reduce the thickness of the inner chamber housing the liquid 25 as much as possible; and a theoretical limit to such reduction would be approximately one-tenth the thickness of the chamber housing the polymerizable material 24. To achieve the greatest amount of spacing support for the membrane 23, the honeycomb constructions on the opposite sides thereof may be staggered as shown in FIGURE 1, the most uniform distribution of the support being effected where the honeycomb on one side of the membrane is so positioned that its strips will be opposite the area that is substantially intermediate the strips of the honeycomb on the other side of the membrane or so that the honeycomb on one side of the membrane is substantially 180 degrees out of phase with the honyecomb on the other.

Where the above described honeycomb structure is made of a fluid-impervious material and the edges of the strips thereof are adhered to and in fluid-tight association with the membrane and the walls 21 and 22, a further advantageous result is the fact that it divides each of the chambers housing the fluids 24 and 25 into a plurality of substantially smaller compartments, each of which is capable of containing and confining a much smaller quantity of the particular fluids. Thus, if for any reason, a puncture through the wall construction should occur and not be immediately sealed, only the limited amount of the fluid within the individual compartment would be lost by the resultant flow and the great bulk of the material would still remain for future sealings. Moreover, in the event the chamber housing the innermost fluid 25 is of a substantial thickness such as is shown in FIGURES 2, 3 and 4 and the sealing plug 33 does not, by virtue of the fact that the flow is in the opposite direction, act to seal the opening that is made by the puncture through the inner wall 22, only a limited amount of the fluid 25 is free to escape from or evaporate through the opening 29. It has been found however that where the honeycomb 34 within the fluid 25 is present, it, in addition to holding the membrane spaced from the wall 22 prevents any bellowing of the type that would tend to "pump" the fluid from the opening 29 so that the fluid does not in fact tend to escape from even the particular compartment which has been penetrated. This saving is even further insured where the space between the wall 22 and the membrane 23 is held to a minimum. While the potential loss of fluid from an unclosed opening will of course be limited by the dimensions of the compartments formed by the honeycomb, it has been found that honeycomb structures defining compartments of not less than two to three inches in their greatest dimension are preferred for the reason that, while they provide adequate support for the wall members of the unit and will prevent any substantial loss of the fluid components, they will not be subject to deleterious crushing or collapse upon being struck by a high velocity particle.

Depending upon its ultimate use and the manner in which it will be associated with a space craft, the self-sealing construction above described may be made by a variety of laminating techniques, all of which generally involve the layer-by-layer application of first one of the outside walls of the construction, then a honeycomb layer, then the membrane, another honeycomb layer, and finally the other outer wall. To provide the desired fluid-tight and dimensionally stable association between the honeycombs and the walls or layers with which they are in contact, an adhesive such as a rubber cement or the like may be applied to each of the layers before the next layer is superimposed thereon. Also during the laminating process, attention is given to the provision within the walled chambers and compartments of the reactive fluids. While means such as a hypodermic-like insertion may be employed for filling the fluid compartments after the self-sealing unit has been completed it is perhaps more convenient to place the fluid in the honeycomb compartments before the honeycomb structure is covered by the wall or layer next to be applied thereto. Thus, after the first honeycomb has been applied for example to the outside wall 21, the viscous fluid 24 may be poured into the honeycomb compartments before applying adhesive to the exposed edges of the honeycomb and thereafter placing the membrane 23 thereover to completely enclose these compartments. Similarly, after the membrane has been coated with an adhesive and the second honey comb 34 applied thereto, the low viscosity fluid 25 may be placed in the honeycomb compartments before the final application of the inside wall 22. Once such a construction has been completed, it may be associated with the space vehicle in a variety of conventional manners, by adhesives for example, either in connection with the general structure of the space vehicle or in association only with specific cabins or areas therein. In order to insure a complete puncture-proof enclosure, the design and application of such constructions should be such that all vulnerable areas, or at least those which are inaccessible from the standpoint of leak repairs, will be covered, protected by or exposed to the self-sealing effects provided by the construction. Thus for example, where a door is provided in the enclosed area of the controlled atmosphere, a self-sealing construction of the present invention should be applied so as to overlap the outline of the door.

While the above discussion of the reactive fluid components has centered primarily around the diisocyanate-amine polymerization products, it is to be understood that the teachings of the present invention are also applicable to other polymerization products which, under various differing circumstances of the type that might be encountered in space travel, are capable of forming the same type of self-sealing plug and wall construction. Included within these other materials are such polymerizable materials as the silicones, the polysulfides, the epoxys and the polyesters. As the polymerizing, cross-linking or catalytic agents to be employed in connection with these other materials, the peroxides can be used advantageously in conjunction with the polysulfides and the polyesters; the amines can be employed with the epoxys; and stannous octoate has been found to be somewhat slower in reaction time but still capable of producing satisfactory results in conjunction with the silicone materials. Regardless of which of these particular materials or combinations of materials are employed however, it is still essential that the viscosities thereof be controlled by various well-known compounding expedients according to the foregoing discussion.

Further modifications of the foregoing teachings include reversing the relative viscosities and positions of the reactive fluids, for example by making the polymerizing fluid such as the amine of a relatively high viscosity and placing it in the wall chamber outwardly of the diisocyanate material compounded to a lower viscosity. Various other arrangements of the reactive fluids according to the teachings herein might also include the provision of one or more additional fluid chambers, preferably toward the interior of the vehicle, by the addition of alternating honeycombs, membranes and wall layers. Such a construction might involve two spaced membranes between which is housed a polymerizing fluid of relatively low viscosity, outwardly and on both sides of which are fluid chambers housing the high-viscosity polymerizable fluid such as the diisocyanate.

While the within invention has been described in considerable detail in connection with certain preferred embodiments thereof, it is to be understood that the foregoing particularization and detail have been for the purposes of illustration only and do not limit the scope of the invention as it is defined in the subjoined claims.

I claim:

1. A self-sealing construction for space vehicles comprising a hollow-walled closure unit having an outer fluid-impervious wall and an inner fluid-impervious wall spaced from said outer wall; a pierceable fluid-impervious membrane within the hollow wall spaced from said outer wall and said inner wall and dividing said hollow wall into at least two fluid-tight chambers, a high viscosity fluid in one of said chambers and a relatively low viscosity fluid in the other of said chambers, one of said fluids being a polymerizable material of the class of materials consisting of the diisocyanates, the silicones, the polysulfides, the epoxys and the polyesters, the other of said fluids being a polymerizing agent for said polymerizable fluid, means in combination with said membrane and said hollow walled unit for subdividing at least one of said chambers into a plurality or smaller compartments.

2. A self-sealing construction according to claim 1 wherein said means are a honeycomb structure.

3. A self-sealing construction according to claim 2 wherein said honeycomb structure comprises interconnecting strips of a rigid, fluid-impervious and corrosion resistant material, the respective edges of which are in fluid-tight association with said membrane on the one hand and with said closure unit on the other hand.

4. A self-sealing construction for space vehicles comprising a hollow-walled closure unit having an outer fluid-impervious wall and an inner fluid-imperivous wall spaced from said outer wall; a pierceable fluid-impervious membrane within the hollow wall spaced from said outer wall and said inner wall and dividing said hollow wall into at least two fluid-tight chambers, a high viscosity fluid in one of said chambers and a relatively low viscosity fluid in the other of said chambers, one of said fluids being a polymerizable material consisting of polypropylene oxide toluene diisocyanate adduct having a viscosity of approximately 10,000 poises and the other of said fluids being triethylene tetramine having a viscosity below 400 centipoises; a honeycomb construction of interconnecting strips of rigid, fluid-impervious material positioned in said outer chamber; the edges on one side of said strips being in fluid-tight association with said outer wall and the edges on the opposite side of said strips being in fluid-tight association with said membrane.

5. A self-sealing construction according to claim 4 wherein a second honeycomb construction of interconnecting strips of a rigid, fluid-impervious material is positioned in said inner chamber, the edges on one side of said strips of said second honeycomb are in fluid-tight association with said inner wall and the edges on the opposite side of said strips of said second honeycomb construction are in fluid-tight association with said membrane.

References Cited by the Examiner

UNITED STATES PATENTS

| | | | |
|---|---|---|---|
| 2,439,562 | 4/1948 | Cunningham | 220—63 |
| 2,756,875 | 7/1956 | Yochim | 206—47 |
| 2,862,616 | 12/1958 | Capozzi et al. | 206—47 |
| 2,993,233 | 7/1961 | Hoppe et al. | 260—2.5 |
| 3,033,734 | 5/1962 | Price | 154—44.1 |
| 3,048,509 | 8/1962 | Sweet et al. | 161—145 |
| 3,057,469 | 10/1962 | Bond et al. | 206—47 |

OTHER REFERENCES

"Sandwich Construction for Primary Structure of Missiles and Space Vehicles," by Robert Foral, Aerospace Engineering, July 1961, pages 24, 25 and 93–99, pages 95–98 cited.

ALEXANDER WYMAN, *Primary Examiner.*

EARL M. BERGERT, R. J. ROCHE,
*Assistant Examiners.*